(12) United States Patent
Lee

(10) Patent No.: US 6,404,973 B1
(45) Date of Patent: Jun. 11, 2002

(54) OPTICAL FIBER DECORATIVE ARTICLE

(76) Inventor: Jean-Hway Lee, P.O. Box 6-57, Chung-Ho City, Taipei Hsien 235 (TW)

( * ) Notice: Subject to any disclaimer, the term of this patent is extended or adjusted under 35 U.S.C. 154(b) by 0 days.

(21) Appl. No.: 09/721,991

(22) Filed: Nov. 27, 2000

(30) Foreign Application Priority Data

Feb. 1, 2000 (CN) .......................................... 00100447 A

(51) Int. Cl.$^7$ ................................................ G03B 6/04
(52) U.S. Cl. ...................................... 385/901; 362/565
(58) Field of Search ................................ 385/115, 116, 385/401; 362/551–564

(56) References Cited

U.S. PATENT DOCUMENTS

| | | | | |
|---|---|---|---|---|
| 3,758,285 A | * | 9/1973 | Knowlton ...................... | 65/64 |
| 3,849,219 A | * | 11/1974 | Hall-Jackson .............. | 156/73.6 |
| 3,881,976 A | * | 5/1975 | Jones .......................... | 156/180 |
| 4,025,779 A | * | 5/1977 | Ahroni ........................ | 362/565 |
| 4,034,215 A | * | 7/1977 | Hashimoto .................. | 362/565 |
| 4,097,917 A | * | 6/1978 | McCaslin .................... | 362/565 |
| 5,422,797 A | * | 6/1995 | Shattan ........................ | 362/123 |

* cited by examiner

*Primary Examiner*—Hemang Sanghavi
*Assistant Examiner*—Scott A Knauss
(74) *Attorney, Agent, or Firm*—Troxell Law Office PLLC

(57) ABSTRACT

An optical fiber decorative article comprises a plurality of optical fibers of same length. The optical fibers are aligned in a fiber array and provided with a gluey connection band along the portion of the optical fiber near one light input ends thereof. The fibers are bent with bent angle gradually increasing such that one straight side is formed on one side of the fiber array and a most-bent side is formed on another side of the fiber array. The fiber array is wound from the straight side to the most-bent side, thus forming a bouquet-shape optical fiber decorative article. The optical fiber decorative article is mounted on a movable carrier to generate light ring thereon.

3 Claims, 4 Drawing Sheets

OPTICAL FIBER DECORATIVE ARTICLE

BACKGROUND OF THE INVENTION

(1) Field of the Invention

The present invention relates to an optical fiber decorative article and the manufacturing method for making the same, the optical fiber decorative article having broader application.

(2) Description of the Prior Art

FIG. 1 shows a conventional stellate optical fiber decorative article 5 comprising a plurality of optical fibers 51. The input ends of the optical fibers 51 are bundled and connected to a light source 52. The light is emitted from the free ends (output ends) of the optical fibers 51 to form a stellate pattern. Moreover, the light source 52 can be driven to rotate to produce a stellate pattern in dynamic fashion. When the optical fiber decorative article 5 is placed on a flat plane, the free ends of the optical fibers 51 fall naturally due to the weight thereof. The light emitted from the free output ends of the optical fibers 51 form a stellate pattern. However, because the stellate pattern relies on the weight of the free output ends of the optical fibers 51. The optical fiber decorative article 5 can only be placed on a flat plane, and can not be placed on a vertical plane such as a wall or placed inversely such as on a ceiling.

It is an object of the present invention to provide an optical fiber decorative article with broad application and the manufacturing method for making the same.

To achieve above object, the present invention provides an optical fiber decorative article comprising a plurality of optical fibers of same length. The optical fibers are aligned in a fiber array and provided with a gluey connection band along the portion of the optical fiber near one light input ends thereof. The fibers are bent with bent angle gradually increasing such that one straight side is formed on one side of the fiber array and a most-bent side is formed on another side of the fiber array. The fiber array is wound from the straight side to the most-bent side, thus forming a bouquet-shape optical fiber decorative article. The optical fiber decorative article is mounted on a movable carrier to generate light ring thereon.

The various objects and advantages of the present invention will be more readily understood from the following detailed description when read in conjunction with the appended drawing, in which:

DETAILED DESCRIPTION OF THE PREFERRED EMBODIMENTS

Figure 1:
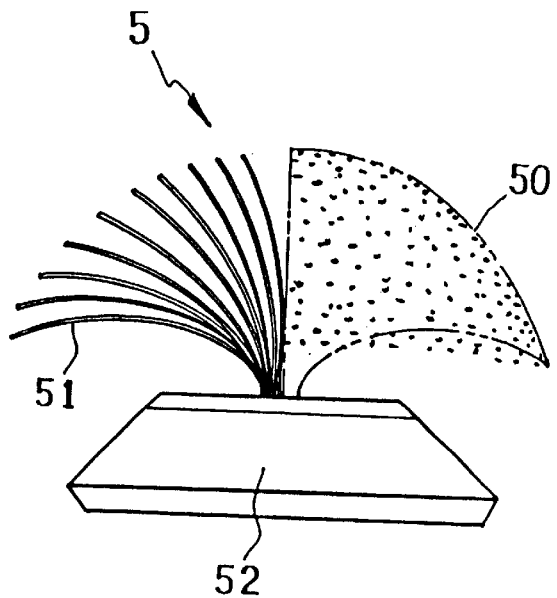
FIG. 1 is a schematic view of the prior art optical fiber decorative article.
Figure 2:
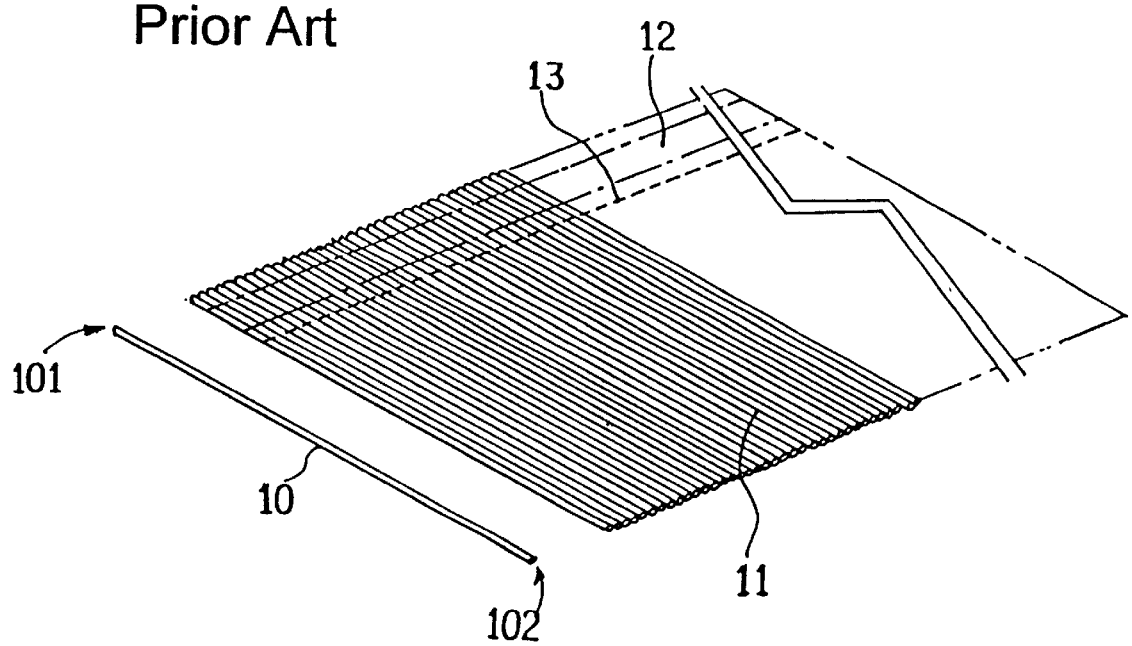
FIG. 2 is a schematic view of the inventive fiber array.
Figure 3:
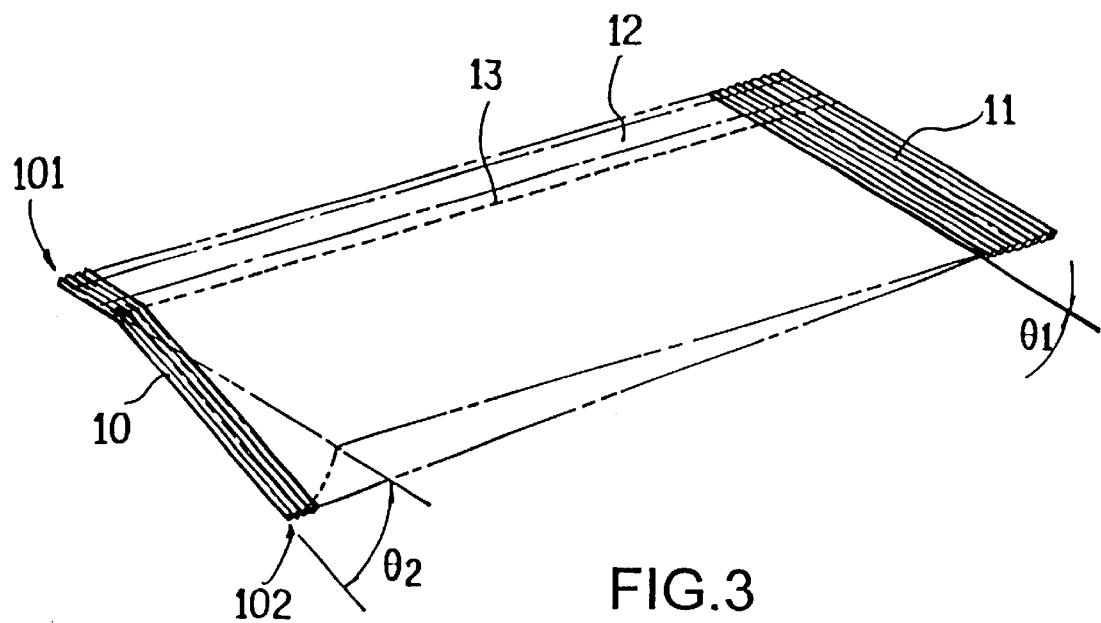
FIG. 3 is another schematic view of the inventive fiber array.
Figure 4:
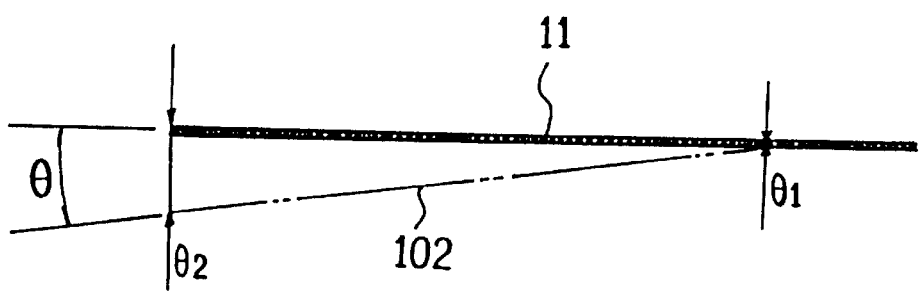
FIG. 4 is still another schematic view of the inventive fiber array.
Figure 5:
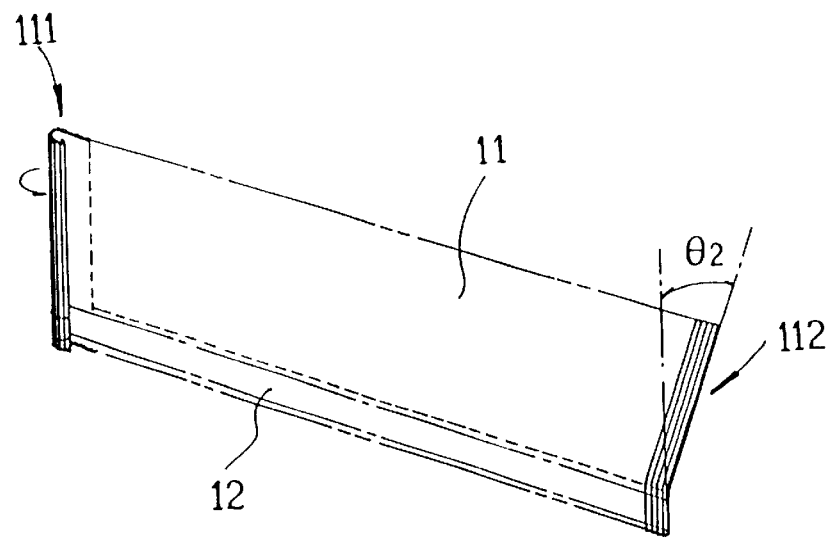
FIG. 5 shows the winding of the fiber array.
Figure 6:
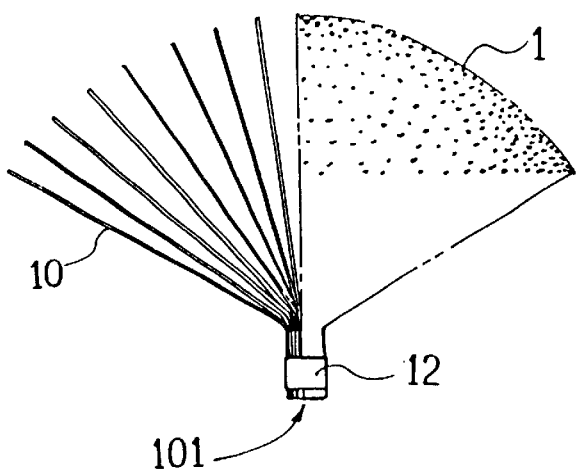
FIG. 6 is a schematic view of the inventive bouquet-shape optical fiber decorative article.
Figure 7:
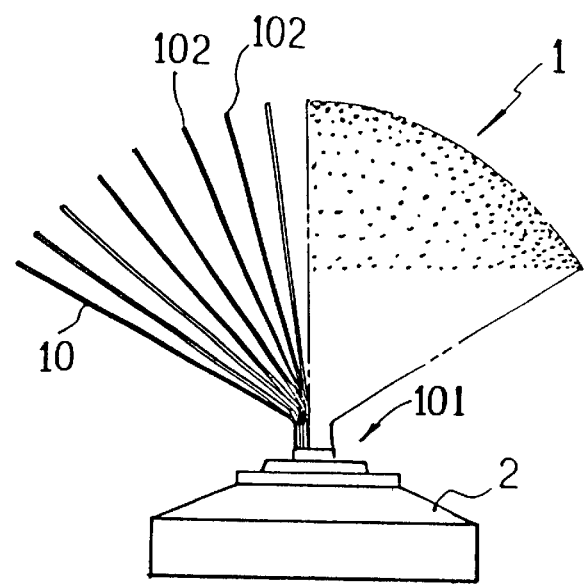
FIG. 7 is a preferred embodiment of the inventive bouquet-shape optical fiber decorative article.

The present invention is intended to provide an optical fiber decorative article and the manufacturing method for making the same. The inventive optical fiber decorative article has broader application. The manufacturing method for the inventive optical fiber decorative article is described below. Firstly, a plurality of optical fibers 10 with slight rigidity are arranged in a row as shown in FIG. 2, thus forming a rectangular fiber array 11. One end of each optical fiber 10 is a light input end 101 and another end of the optical fiber 10 is a light output end 102. A connection band 12 is formed on the fiber array 11 and near the light input end 101 by applying binding paste or other binding agent. The connection band 12 has flexibility such that the connection band 12 can be wound. A fold line 13 is formed beside the side of connection band 12 facing the light output end 102. Afterward, the plurality of optical fibers 10 are bent sequentially along the fold line with bent angle gradually increasing from 0 degree to a specific θ degree as shown in FIGS. 3 and 4. Therefore, as shown in FIG. 5, a straight side 111 and a most-bent side 112 opposite to the straight side 111 are formed. Afterward, the fiber array 11 is rolled from the straight side 111 to the most-bent side 112, thus forming a stellate optical fiber decorative article as shown in FIG. 6. The light input ends 101 are then cut to have even surface, thus finishing the inventive bouquet-shape optical fiber decorative article 1. The inventive bouquet-shape optical fiber decorative article 1 is then coupled to a light source 2 as shown in FIG. 7. The light emitted from the light source is launched to the light input ends 101 and from the light output end 102, thus providing a stellate light effect. Because the plurality of optical fibers 10 are made with slight rigidity, the inventive bouquet-shape optical fiber decorative article 1 can be mounted on a wall or a ceiling with distortion. Moreover, the plurality of optical fibers 10 are bent with gradually increasing angle, the inventive bouquet-shape optical fiber decorative article 1 has uniform light emitting effect.

Figure 8:
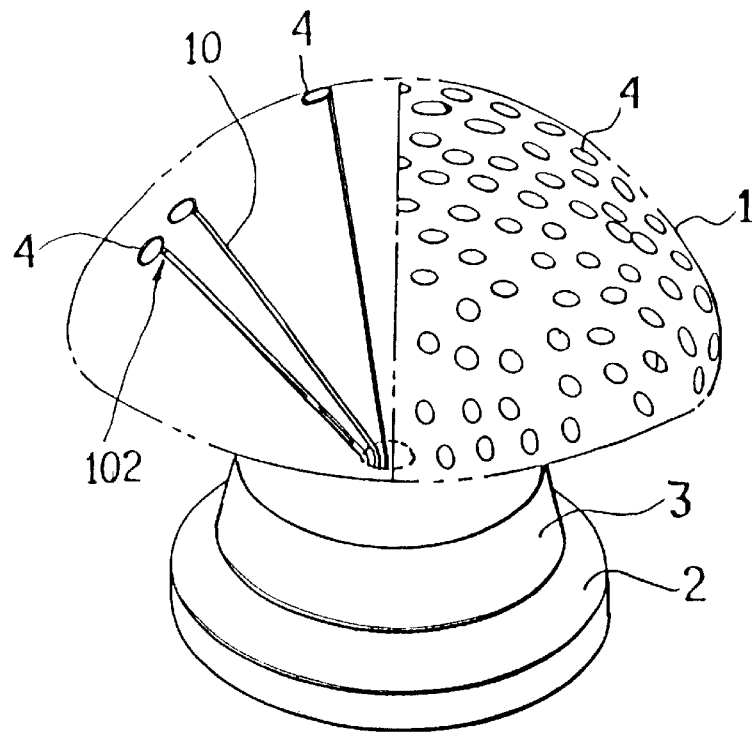
FIG. 8 is another preferred embodiment of the inventive bouquet-shape optical fiber decorative article.

As shown it, FIG. 8, in a preferred embodiment of the present invention, the inventive bouquet-shape optical fiber decorative article 1 is mounted on a carrier 3 which is rotated in a specific angular frequency to provide acentric or fluctuant light emitting effect. For example, the carrier 3 moves the inventive bouquet-shape optical fiber decorative article 1 circularly. The light spots from the light output end 102 forms a plurality of light rings due to the persistence of vision. Moreover, the carrier 3 can be swung or vibrated to provide dynamic light effect. The bouquet-shape optical fiber decorative article 1 can be directly or indirectly mounted on a carrier 3.

In another preferred embodiment of the present invention, a plurality of fiber arrays 11 are stacked and simultaneously wound to form a dense bouquet-shape optical fiber decorative article 1. Therefore, a dense stellate light pattern is provided.

Moreover, the straight side 111 can have larger length such that the top of the bouquet-shape optical fiber decorative article 1 has brighter lightening.

Figure 9:
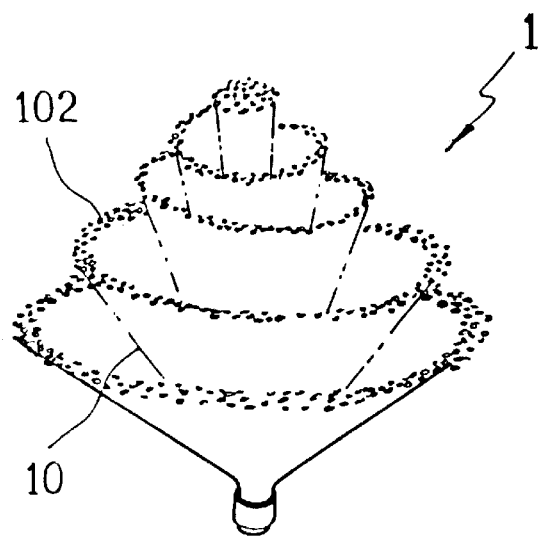
FIG. 9 is still another preferred embodiment of the inventive bouquet-shape optical fiber decorative article.

Moreover, the bent angle of the optical fiber 10 is such designed that the optical fiber decorative article 1 has light output end 102 in spiral pattern as shown in FIG. 9.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

What is claimed is:

1. An optical fiber decorative article comprises a plurality of optical fibers of same length; said optical fibers being aligned in a side-by-side array and connected together by an adhesive band along a portion of said optical fiber array adjacent to light input ends of the optical fibers; said fibers being bent at a bent angle different from adjacent fibers to form the fiber array with one straight side on one side of said fiber array and a bent side is on an opposite side of said fiber array; said fiber array being spirally wound from said straight side to said bent side, thus forming a bouquet-shape optical fiber decorative article with the straight side in a central location.

2. The optical fiber decorative article as in claim 1, further comprising a movable carrier wherein said optical fiber array is mounted on the movable carrier.

3. The optical fiber decorative article as in claim 1, comprising a plurality of fiber arrays stacked to form a dense optical fiber decorative article.

* * * * *